United States Patent
Quinn et al.

(10) Patent No.: US 7,685,870 B2
(45) Date of Patent: Mar. 30, 2010

(54) SYSTEMS AND METHODS FOR PERFORMING COOLING AIRFLOW ANALYSIS OF GAS TURBINE ENGINE COMPONENTS

(75) Inventors: Daniel E. Quinn, Windsor, CT (US); Kurt A. Hassett, Manchester, CT (US)

(73) Assignee: United Technologies Corporation, Hartford, CT (US)

( * ) Notice: Subject to any disclaimer, the term of this patent is extended or adjusted under 35 U.S.C. 154(b) by 0 days.

(21) Appl. No.: 11/862,238

(22) Filed: Sep. 27, 2007

(65) Prior Publication Data

US 2009/0084170 A1    Apr. 2, 2009

(51) Int. Cl.
*G01M 15/14*    (2006.01)
(52) U.S. Cl. .................................................. 73/112.01
(58) Field of Classification Search .............. 73/112.01, 73/112.03, 112.04, 112.05, 112.06
See application file for complete search history.

(56) References Cited

U.S. PATENT DOCUMENTS

| | | | |
|---|---|---|---|
| 3,710,617 A * | 1/1973 | Andersen | 73/116.03 |
| 5,313,822 A | 5/1994 | Bees et al. | |
| 5,377,534 A * | 1/1995 | Boet | 73/112.01 |
| 5,396,793 A * | 3/1995 | Colletti | 73/116.03 |
| 5,405,106 A * | 4/1995 | Chintamani et al. | 244/23 D |
| 5,437,737 A | 8/1995 | Draghi et al. | |
| 5,625,958 A | 5/1997 | DeCoursey et al. | |
| 6,237,426 B1 | 5/2001 | Gryc et al. | |
| 6,431,555 B1 | 8/2002 | Schroder et al. | |
| 6,595,742 B2 * | 7/2003 | Scimone | 415/121.2 |
| 6,772,627 B2 | 8/2004 | Fleming | |
| 6,808,552 B2 * | 10/2004 | Borla | 95/273 |
| 6,923,051 B2 | 8/2005 | Fleming | |
| 7,021,892 B2 | 4/2006 | Sidwell | |
| 7,024,929 B2 | 4/2006 | Fleming et al. | |
| 7,204,019 B2 | 4/2007 | Ducotey, Jr. et al. | |
| 7,207,213 B2 * | 4/2007 | Gerhardt et al. | 73/112.01 |
| 7,207,228 B2 | 4/2007 | Wang | |
| RE40,481 E * | 9/2008 | Borla | 95/273 |
| 7,491,253 B2 * | 2/2009 | Wilson | 55/306 |

* cited by examiner

*Primary Examiner*—Eric S McCall
(74) *Attorney, Agent, or Firm*—Kinney & Lange, P.A.

(57) ABSTRACT

Systems and methods for performing cooling airflow analysis of gas turbine engine components are provided. In this regard, a representative system includes an airflow insert operative to form a seal with a component, the airflow insert having a main portion and a removable sacrificial portion, the sacrificial portion being sized and shaped to engage the component, the main portion having a cavity sized and shaped to removably receive the sacrificial portion, the main portion being sized and shaped to form a seal about the sacrificial portion and a corresponding portion of the component.

19 Claims, 3 Drawing Sheets

SYSTEMS AND METHODS FOR PERFORMING COOLING AIRFLOW ANALYSIS OF GAS TURBINE ENGINE COMPONENTS

BACKGROUND

1. Technical Field

The disclosure generally relates to gas turbine engines.

2. Description of the Related Art

Gas turbine engines typically incorporate turbine blades and vanes that are gas-cooled. To facilitate gas-cooling, the blades and vanes include internal passages that route cooling gas to holes formed through to the exterior surfaces of the blades and vanes. So configured, the passages and holes provide thin films of cooling gas about the exterior of the blades and vanes. Notably, since sizes, shapes and cooling provisioning of blades and vanes are not standardized, each type of blade and vane typically requires a different pressure, volumetric flow and distribution of cooling gas in order to operate properly.

SUMMARY

Systems and methods for performing cooling airflow analysis of gas turbine engine components are provided. In this regard, an exemplary embodiment of a system comprises: an airflow insert operative to form a seal with a component, the airflow insert having a main portion and a removable sacrificial portion, the sacrificial portion being sized and shaped to engage the component, the main portion having a cavity sized and shaped to removably receive the sacrificial portion, the main portion being sized and shaped to form a seal about the sacrificial portion and a corresponding portion of the component.

An exemplary embodiment of an airflow insert for performing cooling airflow analysis of a gas turbine engine component comprises: a main portion; and a sacrificial portion, the sacrificial portion being sized and shaped to engage the turbine component; the main portion having a cavity sized and shaped to removably receive the sacrificial portion, the main portion being sized and shaped to receive the sacrificial portion and form a seal about a corresponding portion of the component.

An exemplary embodiment of a method for performing cooling airflow analysis of a gas turbine engine component comprises: providing a component for airflow testing; engaging the component with an airflow insert to form a seal about at least a portion of the component, the airflow insert having a main portion and a sacrificial portion, the sacrificial portion being removably attached to the main portion such that, in an installed configuration, the main portion and the sacrificial portion form an airtight seal about a portion of the component; and testing the component with the airflow insert engaged therewith.

Other systems, methods, features and/or advantages of this disclosure will be or may become apparent to one with skill in the art upon examination of the following drawings and detailed description. It is intended that all such additional systems, methods, features and/or advantages be included within this description and be within the scope of the present disclosure.

BRIEF DESCRIPTION OF THE DRAWINGS

Many aspects of the disclosure can be better understood with reference to the following drawings. The components in the drawings are not necessarily to scale. Moreover, in the drawings, like reference numerals designate corresponding parts throughout the several views.

DETAILED DESCRIPTION

Systems and methods for performing cooling airflow analysis are provided, several exemplary embodiments of which will be described in detail. In this regard, turbine blades and vanes oftentimes are tested to determine cooling airflow characteristics. Unfortunately, these components can include sharp features, e.g. feather seals, which can damage the airflow test systems that are used to analyze the components. By way of example, sharp edges of the components can damage airflow inserts, which are used to form airtight seals about portions of the components so that gas can be routed through the components for testing. By providing a replaceable, sacrificial portion of such an airflow insert that is designed to engage a sharp edge of a turbine blade or vane, damage to the entire airflow insert can potentially be avoided. Specifically, damage caused by a sharp edge, for example, can potentially be isolated to the sacrificial portion and readily removed. A replacement sacrificial portion then can be installed.

Figure 1:
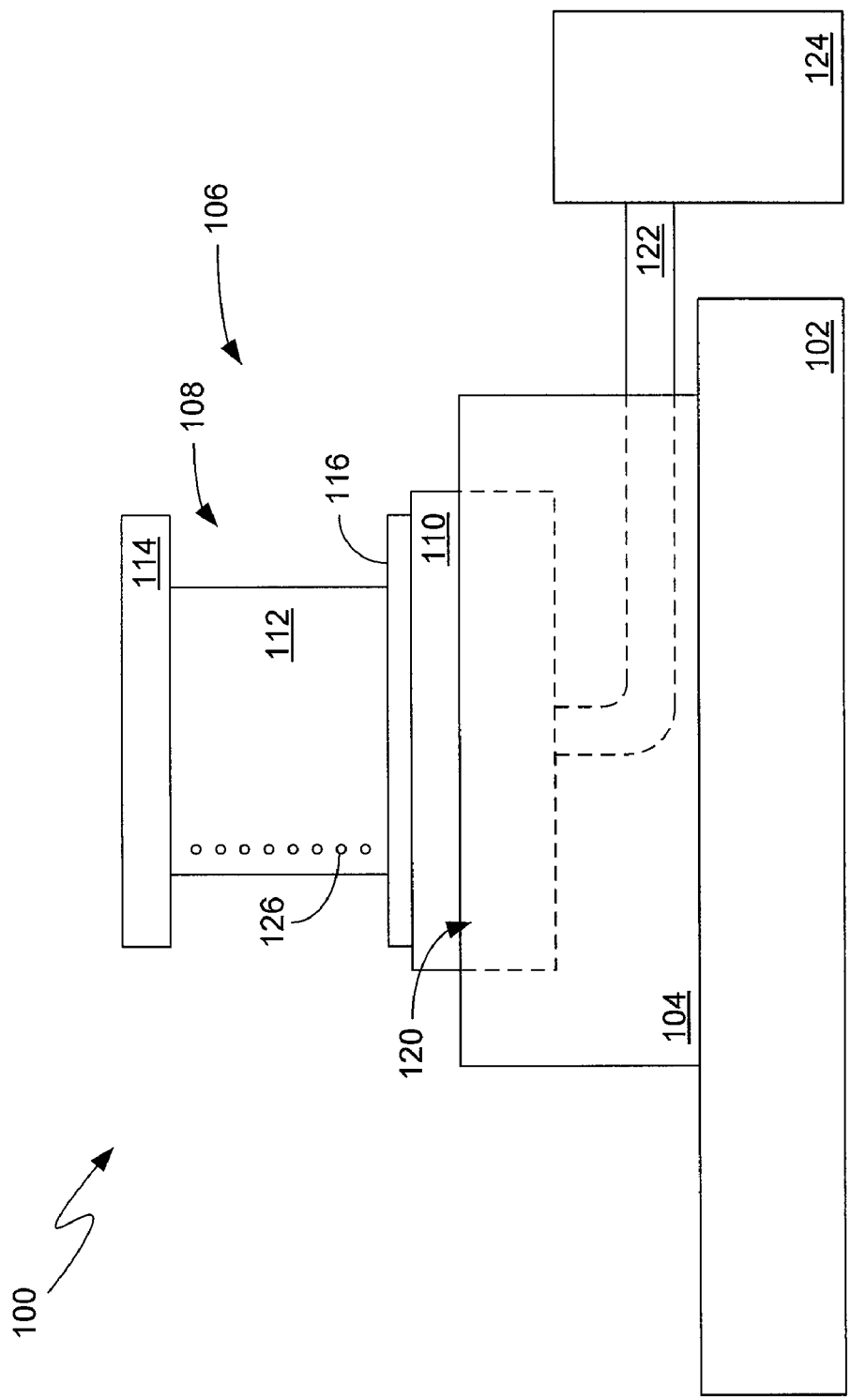
FIG. 1 is a schematic diagram depicting an embodiment of a system for performing cooling airflow analysis.

In this regard, reference is made to the schematic diagram of FIG. 1, which depicts an exemplary embodiment of an airflow test system. As shown in FIG. 1, system 100 includes an airflow test bench 102. Bench 102 supports a test fixture 104, which is sized and shaped to accommodate placement of an airflow component assembly 106. Assembly 106 includes a turbine component 108 (e.g., a turbine blade or vane) that is to be tested and an airflow insert 110.

In the embodiment of FIG. 1, component 108 is a vane assembly that includes an airfoil portion 112, an inner diameter platform 114 and an outer diameter platform 116. Airflow insert 110 engages and forms an airtight seal about a portion of platform 116.

In operation, airflow component assembly 106 is mounted to the test fixture, with at least a portion of the airflow insert being seated within a corresponding recess 120 of the test fixture. A metered flow of gas (e.g., air) is provided to the test fixture via a gas supply line 122, which interconnects a gas supply 124 associated with the test bench to the test fixture. From the test fixture, the metered flow of gas enters an interior passage (not shown) of the vane and exits the vane through film-cooling holes, e.g., hole 126. In other embodiments, another fluid (e.g., water) could be used to perform various testing, such as determining flow blockage through a portion of the component being tested.

During testing, various parameters can be measured. By way of example, a constant flow parameter can be set thereby enabling pressure ratio to be measured. Additionally or alternatively, a constant pressure ratio can be set and flow parameter can be measured.

Figure 2:
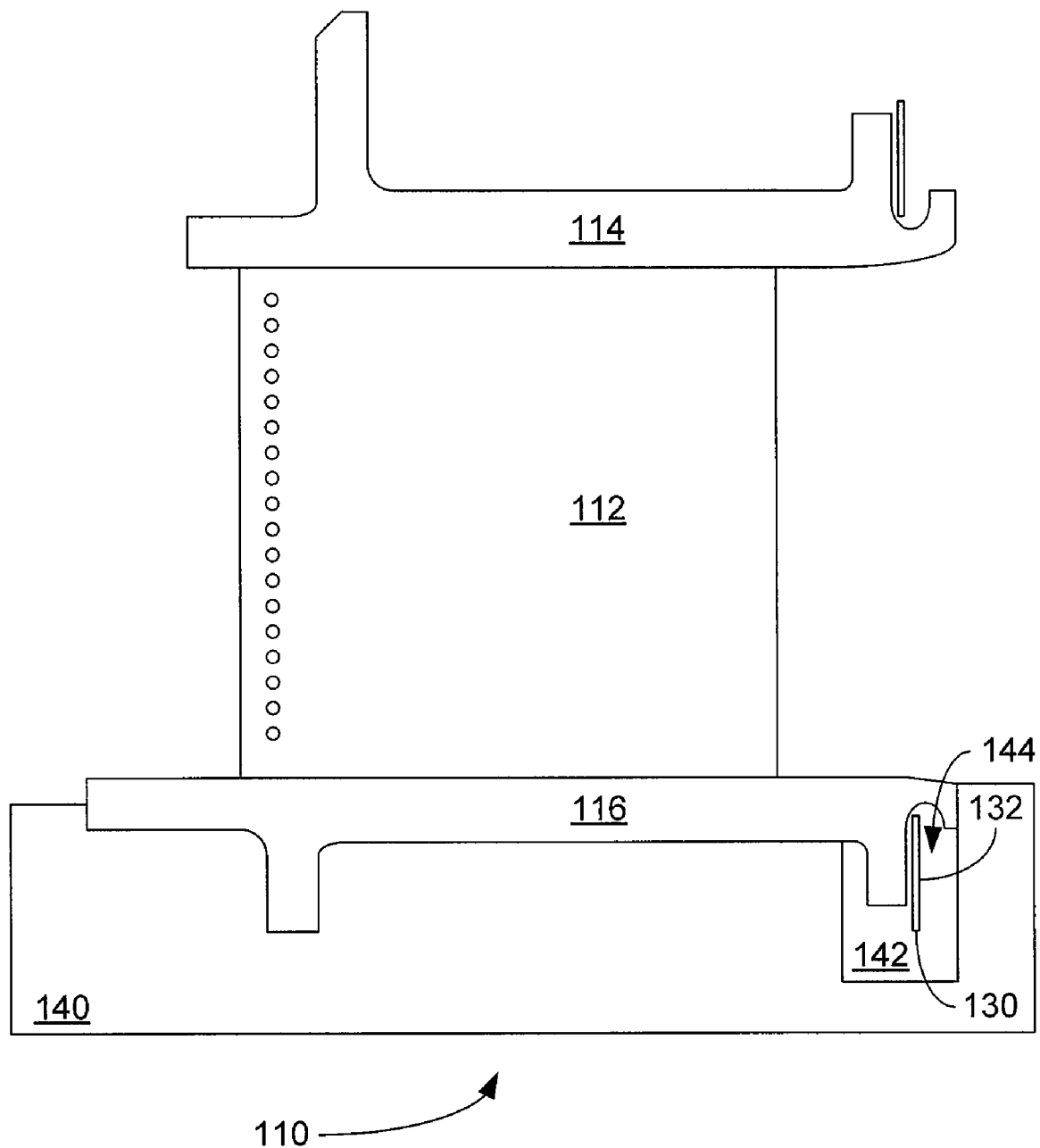
FIG. 2 is a schematic diagram depicting an embodiment of an airflow insert.

The embodiment of the airflow component assembly of FIG. 1 is shown in greater detail in FIG. 2. As shown in FIG. 2, component 108 of airflow component assembly 106 includes sharp edges, of which edge 130 is relevant. In particular, edge 130 corresponds to a feather seal 132 that is engaged by airflow insert 110.

As shown in FIG. 2, airflow insert 110 is a multi-piece assembly that includes a main portion 140 and a sacrificial portion 142. Although this embodiment is a two-piece assembly, various other numbers of pieces could be used in other embodiments. Various materials can be used to form an airflow insert. By way of example, silicone plastic materials, such as Silastic® (manufactured by the Dow Chemical Company), can be used.

Main portion 140 is configured to form an airtight seal about a portion of component 108 that includes edge 130. However, the main portion does not contact edge 130. In particular, sacrificial portion 142 is configured to engage edge 130, while seating within a cavity 144 defined by the main portion. Thus, the sacrificial portion contacts the sharp edge, while the main portion contacts an exterior of the sacrificial portion, as well as a portion of the vane platform.

In this configuration, degradation of the airflow insert caused by the sharp edge can be restricted to the sacrificial portion, which can be removed and replaced when desired. This is in contrast to a one-piece airflow insert, which may require complete replacement if a portion of the airflow insert becomes damaged.

Various other configurations can be used in other embodiments. For instance, more than one sacrificial portion can be used. Other such aspects may be specific to the part being measured. In some embodiments, the sacrificial portion could be made from a different material than that used for the main portion.

Figure 3:
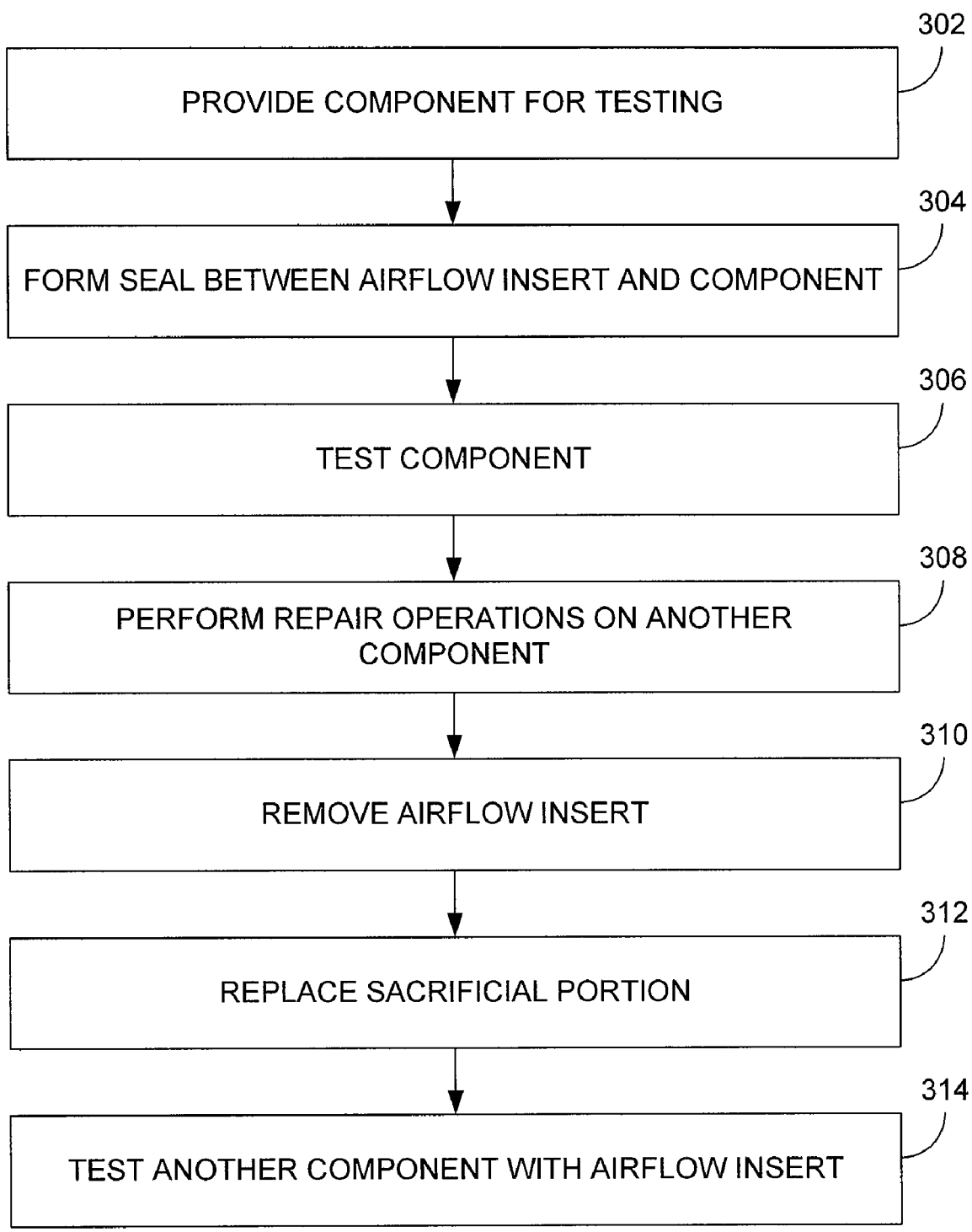
FIG. 3 is a flowchart depicting functionality of an embodiment of a system for performing cooling airflow analysis.

FIG. 3 is a flowchart depicting functionality of an embodiment of a system for performing cooling airflow analysis. As shown in FIG. 3, the functionality (or method) may be construed as beginning at block 302, in which a component (e.g., a turbine blade or vane) is provided for airflow testing. In block 304, the component is engaged with an airflow insert to form a seal about at least a portion of the component. Then, as depicted in block 306, the component is tested. By way of example, the airflow insert can be used to from a seal between the component and a test fixture so that gas can be provided to an interior passage of the component for testing. Notably, during such testing, various parameters such as leakage, restriction and flow (pressure ratio and/or flow parameter) can be measured and/or calculated. Thereafter, such as depicted in block 308, one or more of the parameters can be used to perform repair operations on a similar component. For instance, after a similar component has been dimensionally restored, airflow parameters of that component can be determined and compared to previously acquired parameters to ensure that the restoration process has not adversely affected desired cooling airflow characteristics of the restored component.

Continuing in block 310, the airflow insert is removed from the component that was tested in block 306, and a determination is made as to whether or not the airflow insert is damaged. If the airflow insert is damaged and a sacrificial portion of the insert is affected, the process may proceed to block 312, in which the sacrificial portion is removed and replaced. In block 314, the airflow insert with the replaced sacrificial portion is used to test another component.

It should be noted that a sacrificial portion may be used more than once and can be replaced on an as-needed basis. To determine the need for replacement, various techniques can be used, such as visual inspection and/or diagnostic testing.

It should be emphasized that the above-described embodiments are merely possible examples of implementations set forth for a clear understanding of the principles of this disclosure. Many variations and modifications may be made to the above-described embodiments without departing substantially from the spirit and principles of the disclosure. All such modifications and variations are intended to be included herein within the scope of this disclosure and protected by the accompanying claims.

The invention claimed is:

1. A system for performing cooling airflow analysis of a gas turbine engine component having cooling holes, the system comprising:
    an airflow insert operative to form a seal with the component, the airflow insert having a main portion and a first, removable sacrificial portion, the first sacrificial portion being sized and shaped to engage the component, the main portion having a cavity sized and shaped to removably receive the first sacrificial portion, the main portion being sized and shaped to form a seal about the first sacrificial portion and a corresponding portion of the component; and
    a test fixture operative to engage the airflow insert and provide a flow of gas to the component such that the gas enters the component and departs via the cooling holes.

2. The system of claim 1, further comprising a second sacrificial portion sized and shaped to engage the component, the second sacrificial portion being further sized and shaped to be received by the cavity of the main portion.

3. The system of claim 1, wherein the seal formed between the airflow insert and the component is an airtight seal.

4. The system of claim 1, wherein the test fixture has a recess sized and shaped to receive at least the portion of the component engaged by the airflow insert such that a seal is formed between the test fixture and the airflow insert.

5. The system of claim 1, further comprising:
    a test bench, and the test fixture is supported by the test bench.

6. The system of claim 1, further comprising:
    a gas supply operative to provide a flow of gas to the test fixture.

7. The system of claim 6, wherein the gas is air.

8. An airflow insert for performing cooling airflow analysis of a gas turbine engine component, the insert comprising:
    a main portion; and
    a first sacrificial portion, the first sacrificial portion having a cavity for receiving a sharp edge of the turbine component, the main portion having a cavity sized and shaped to removably receive the first sacrificial portion, the main portion being sized and shaped to receive the first sacrificial portion and form a seal about a corresponding portion of the turbine component.

9. The insert of claim 8, further comprising a second sacrificial portion having a cavity for receiving the sharp edge of the turbine component, the second sacrificial portion being further sized and shaped to be received by the cavity of the main portion in a same manner as the first sacrificial portion such that the second sacrificial portion replaces the first sacrificial portion.

10. The insert of claim 8, wherein the seal formed between the main portion and the component is an airtight seal.

11. The insert of claim 8, wherein the main portion is formed of a material comprising silicone plastic.

12. A method for performing cooling airflow analysis of a gas turbine engine component, the method comprising:
    providing a first component for airflow testing;
    engaging the first component with an airflow insert to form a seal about at least a portion of the first component, the airflow insert having a main portion and a first sacrificial portion, the first sacrificial portion being removably attached to the main portion such that, in an installed configuration, the main portion and the first sacrificial portion form an airtight seal about a portion of the first component;

testing airflow through the first component with the airflow insert engaged therewith; and determining at least one airflow parameter of the first component based on the testing.

13. The method of claim 12, wherein determining the at least one airflow parameter is selected from the group consisting of: leakage, restriction, and flow.

14. The method of claim 12, further comprising:

determining that the first sacrificial portion of the airflow insert is damaged; and replacing the first sacrificial portion with a second sacrificial portion.

15. The method of claim 14, further comprising:

using the airflow insert with the second sacrificial portion to test a second component.

16. The method of claim 15, further comprising:

comparing the at least one airflow parameter of the first component to an airflow parameter of a second, restored component; and determining whether restoration of the second component affected the airflow parameter of the second component.

17. A system for performing cooling airflow analysis of a gas turbine engine component, the system comprising:

an airflow insert operative to form a seal with a turbine vane, the airflow insert having a main portion and a first, removable sacrificial portion, the first sacrificial portion being sized and shaped to engage the turbine vane, the main portion having a cavity sized and shaped to removably receive the first sacrificial portion, the main portion being sized and shaped to form a seal about the first sacrificial portion and a corresponding portion of the component.

18. The system of claim 17, wherein the vane is attached to a platform and the airflow insert is sized and shaped to form the seal about a portion of the platform.

19. An airflow insert for performing cooling airflow analysis of a vane assembly having a platform, the insert comprising:

a main portion; and a first sacrificial portion, the first sacrificial portion having a cavity for engaging the vane assembly, the main portion having a cavity sized and shaped to removably receive the first sacrificial portion, the main portion being sized and shaped to receive the first sacrificial portion and form a seal about a portion of the vane assembly platform.

* * * * *